US006741989B1

(12) United States Patent
Seltzer et al.

(10) Patent No.: US 6,741,989 B1
(45) Date of Patent: May 25, 2004

(54) WEB-BASED METHOD AND SYSTEM FOR EXCHANGING INFORMATION AMONG PARTNERS

(75) Inventors: Clifford Seltzer, Stamford, CT (US); Michael Wesley DePriest, Ridgefield, CT (US)

(73) Assignee: GE Capital Services Structured Finance Group, Inc., Stamford, CT (US)

( * ) Notice: Subject to any disclaimer, the term of this patent is extended or adjusted under 35 U.S.C. 154(b) by 0 days.

(21) Appl. No.: 09/588,985

(22) Filed: Jun. 7, 2000

(51) Int. Cl.[7] .............................................. G06F 17/30
(52) U.S. Cl. ............................. 707/9; 707/10; 715/505
(58) Field of Search .............................. 707/9, 10, 505; 713/200, 201, 202; 709/203; 715/505; 705/7

(56) References Cited

U.S. PATENT DOCUMENTS

| | | | |
|---|---|---|---|
| 5,619,991 A | | 4/1997 | Sloane |
| 5,754,857 A | * | 5/1998 | Gadol ........................ 709/300 |
| 5,802,518 A | | 9/1998 | Karaev et al. |
| 5,819,271 A | | 10/1998 | Mahoney et al. |
| 5,864,871 A | | 1/1999 | Kitain et al. |
| 5,892,909 A | | 4/1999 | Grasso et al. |
| 5,926,624 A | | 7/1999 | Katz et al. |
| 5,947,526 A | * | 9/1999 | Neu ........................... 283/66.1 |
| 5,966,451 A | | 10/1999 | Utsumi |
| 5,987,440 A | | 11/1999 | O'Neil et al. |
| 6,002,753 A | | 12/1999 | Morrision et al. |
| 6,058,368 A | * | 5/2000 | Aourane ........................ 705/7 |
| 6,061,789 A | | 5/2000 | Hauser et al. |
| 6,073,108 A | * | 6/2000 | Peterson ........................ 705/8 |
| 6,298,347 B1 | * | 10/2001 | Wesley ........................ 707/10 |
| 6,341,290 B1 | * | 1/2002 | Lombardo et al. ........ 707/104.1 |
| 6,353,823 B1 | * | 3/2002 | Kumar ........................... 707/3 |
| 6,393,410 B1 | * | 5/2002 | Thompson ..................... 705/37 |
| 6,430,121 B1 | * | 8/2002 | Shiraishi et al. ......... 369/30.28 |
| 6,507,817 B1 | * | 1/2003 | Wolfe et al. ................. 704/260 |

OTHER PUBLICATIONS

Charles E. Grantham "Hollywood: a business model for the future?", ACM 2000, pp. 8–15.*
Dommel et al "A Coordination Architecture for Internet Groupwork", IEEE 2000, pp. 183–190.*
Hamilton et al "Online Access to NODC Information Services", OCEANS 1988, pp. 637–640.*
Jensen et al "Using the Internet to Send & Receive Documents & Automate teh Office", ACM 1995, pp. 77–83.*
International Search Report, dated Jul. 6, 2000, Application No. PCT/US01/18125 for GE Capital Services Structured Finance.

* cited by examiner

Primary Examiner—Uyen Le
(74) Attorney, Agent, or Firm—Armstrong Teasdale LLP (57) ABSTRACT

An information exchange system provides an integrated approach to exchanging information real-time among members of a partnership. The web-based system including a server having a centralized database of business data and at least one client system facilitates a method of restricting database access only to authorized users within the partnership, providing forms stored within server as web pages for the insertion of updated business data for display within web pages displayed on a client system. The method facilitated further includes uploading updated forms for use by other authorized users within the partnership to the server, where the updated business data is stored within the database The uploaded business data is stored within server and authorized users can download web pages causing the updated business data to be displayed on a client system.

32 Claims, 8 Drawing Sheets

WEB-BASED METHOD AND SYSTEM FOR EXCHANGING INFORMATION AMONG PARTNERS

BACKGROUND OF THE INVENTION

This invention relates generally to a computer network-based system and more particularly to a system and method for providing information exchange to members of a partnership on a variety of issues.

For partnerships having numerous partners located in multiple places worldwide, information exchange on a timely basis for partnership related business issues is a major challenge. Most partnership information exchange is paper-driven, therefore resolving issues is sometimes difficult in such business arrangements. Another challenge simply involves the time spent in assembling, formatting and submitting the information to be exchanged. Sometimes after such a lengthy gathering process, the information compiled is already outdated. In addition, much of the manual labor involved is repetitive. As with any paper driven process, archiving is another issue to be dealt with.

Electronic information exchange has dealt with these problems to some extent, however in diverse partnerships, legacy formatting issues and differences in procedures have left much of the inefficiencies unaffected, for example, time expended manually in gathering the information and possibly converting the information into a different format. Overall, both the traditional paper methods and known electronic methods can be very frustrating and may not necessarily facilitate resolving partnership information exchange issues.

It would be desirable to facilitate partnership information exchange by providing a system that allows real-time access to partnership business information, and facilitates updates to the information, while eliminating the inefficiencies of known systems.

BRIEF SUMMARY OF THE INVENTION

The invention provides an integrated approach to providing members of a partnership with information and feedback regarding the business. The method incorporated into the web-based system includes restricting database access only to authorized users within the partnership, providing forms stored within a server as web pages for the insertion updated business data, uploading business data updates intended for use by other authorized users within the partnership to the server for storage in the database, formatting the business data for display using web pages stored within server, and downloading and displaying the web pages to authorized users.

BRIEF DESCRIPTION OF THE DRAWINGS

FIG. 8 is an exemplary example of a web page configured as an authorization for expenditure.

DETAILED DESCRIPTION OF THE INVENTION

Figure 1:
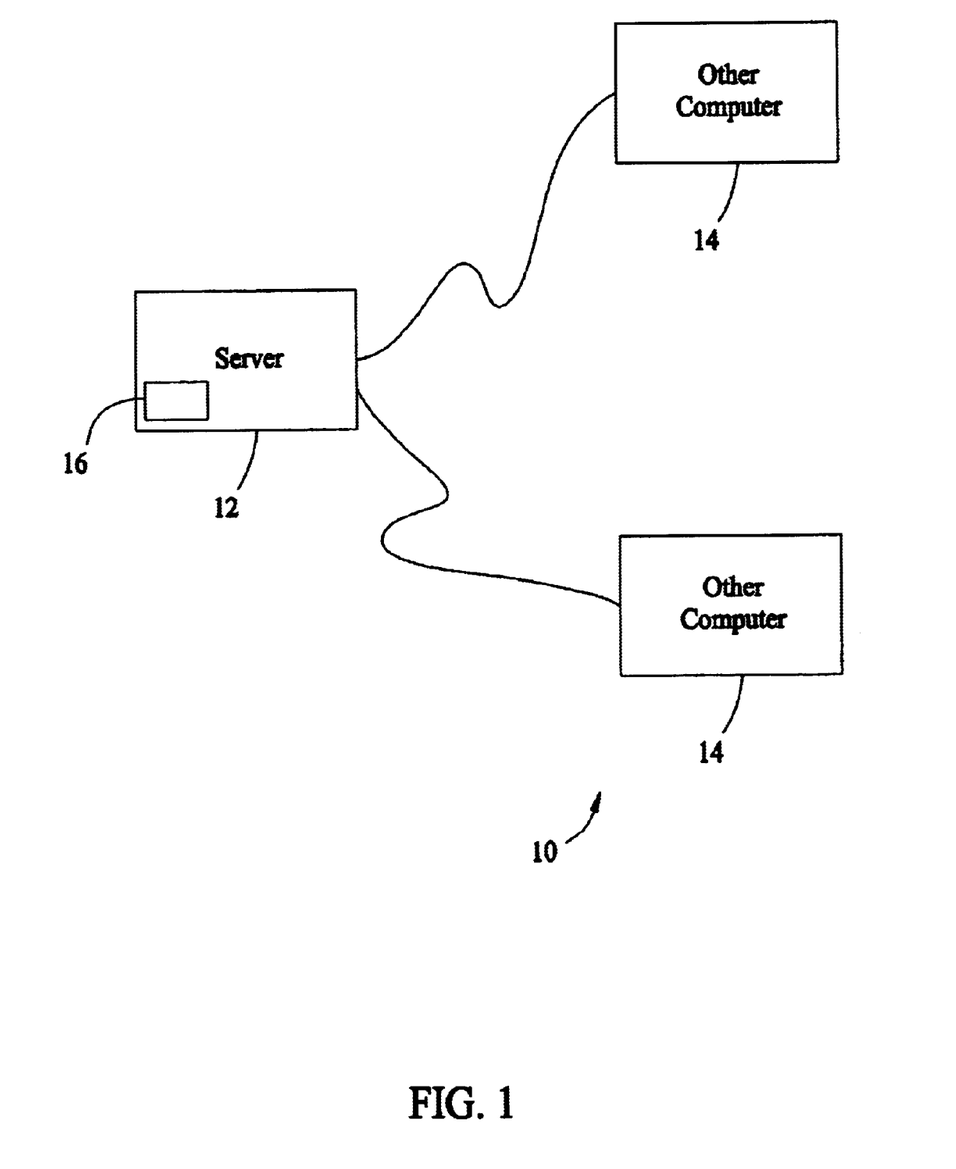
FIG. 1 is a system block diagram.

FIG. 1 is a block diagram of a system 10 in accordance with one embodiment of the present invention. System 10 includes a server system 12 and a plurality of client systems 14 connected to server system 12. In one embodiment, a client system 14 is a computer including a web browser. Server system 12 is accessible to client system 14 via the Internet. Client system 14 is interconnected to the Internet through many interfaces including dial-in-connections, cable modems, special high-speed ISDN lines and networks such as local area networks (LANs) or wide area networks (WANs). Client system 14 could be any client system capable of interconnecting to the Internet including a web-based phone or other web-based connectable equipment. Server 12 is configured with a information exchange program and associated web pages and further includes a database 16 which is configured with, for example, partnership information or data and can be accessed and updated by registered users through the web pages at one of client systems 14 by logging onto server system 12.

Figure 2:
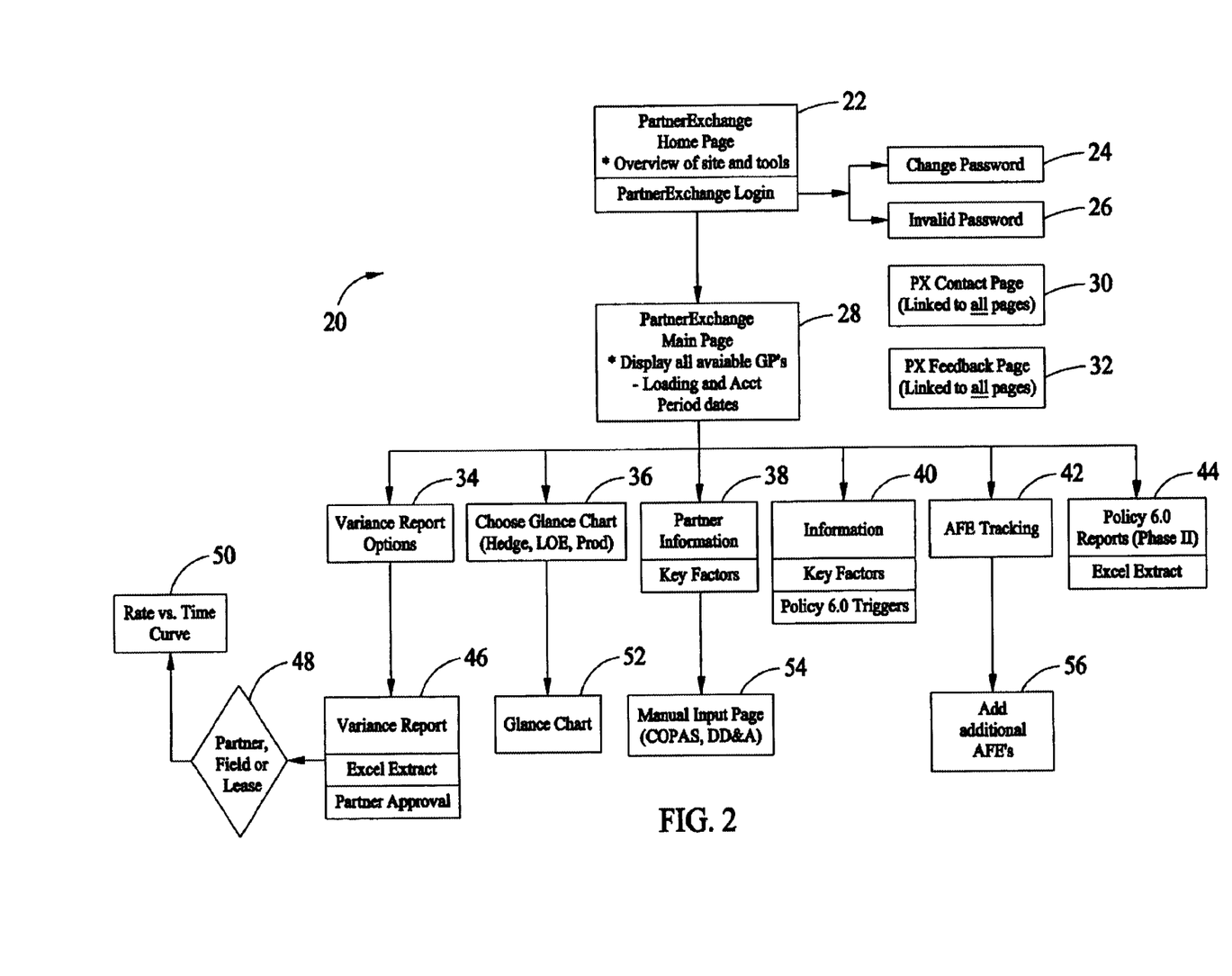
FIG. 2 is a flowchart giving an overview of a web-based information exchange system.

FIG. 2 is a flowchart 20 giving an overview of an information exchange website. A user accesses 22 a home page which gives an overview of the website and the tools available. The home page also requests that the user login. A directory of registered users is maintained as part of database 16 (shown in FIG. 1) and if a user wishes to become a registered user, he or she must contact a site manager, who will confirm that the person should have access to the site before issuing a login name and password. As registered users login, an option is available for changing 24 their password or the user is flagged 26 if they have entered an invalid password. After a successful login, a partner exchange main page is displayed 28. The main page displays all available partners, a date each of the partners last uploaded data to database 16, and each partner's most recent accounting period. Available on all pages of the website is a link which takes 30 a user to a contact page and a second link which takes 32 a user to a website feedback page.

From the partner exchange main page, a registered user may choose from a variety of information exchange tools, denoted as links on the main page. Examples of information exchange tools include, for example, variance reports options 34, choose glance charts 36, a user information page 38, an information page including key factors partners should be aware of 40, an authorization for expenditure page 42, and a policy page 44.

When a user selects variance report options 34, the user is wishing to generate 46 a variance report. Examples of variance reports to be generated include, using an oil and gas exploration partnership as an example, a choice 48 of partner variance chart, an oil field variance chart, and an oil lease variance chart. Variance charts are plotted 50 as a rate versus time curve.

When a user chooses to view glance charts 36, choices might include, still using the oil and gas exploration partnership as an example, a hedge chart, a lease operating expense chart, or a production chart. When the user makes the choice, the glance chart is displayed 52.

When the user information page 38 is selected from the main page, a link to an update tool is also displayed as part of the user information page. Choosing the link causes a manual update page to be displayed 54. Still referring to the oil and gas partnership example, it is within the manual update page where a user may input, for later uploading to server 12 (shown in FIG. 1) information regarding the Council of Petroleum Accounting Society (COPAS) information or depreciation, depletion and amortization (DD&A) information.

The authorization for expenditure page 42 further includes a link where the user may add 56 additional authorizations for expenditure for partnership approval.

Figure 3:
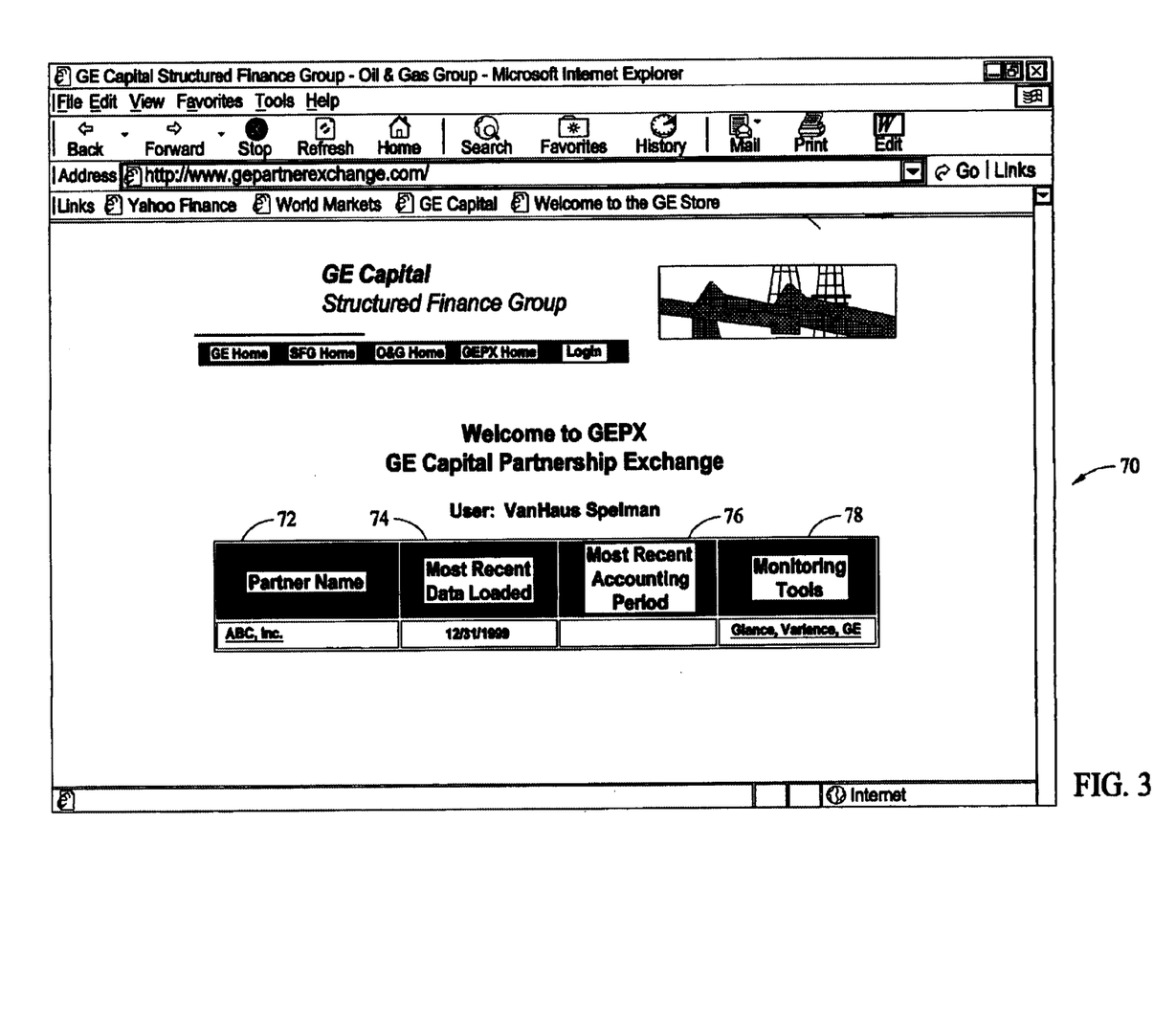
FIG. 3 shows a web page welcoming a registered user.

FIG. 3 is an exemplary example of a main page 70 as described above. Page 70 includes formatted information from database 16 (shown in FIG. 1) including partner names 72, which can act as a link to an information page (described in FIG. 4 below), a date each partner last uploaded data 74 to database 16, when was each partner's most recent accounting period 76, and the choices of monitoring tools 78 available to each partner. Page 70 is configured such that only a partial list of the monitoring tools 78 available to the partners are displayed.

Figure 4:
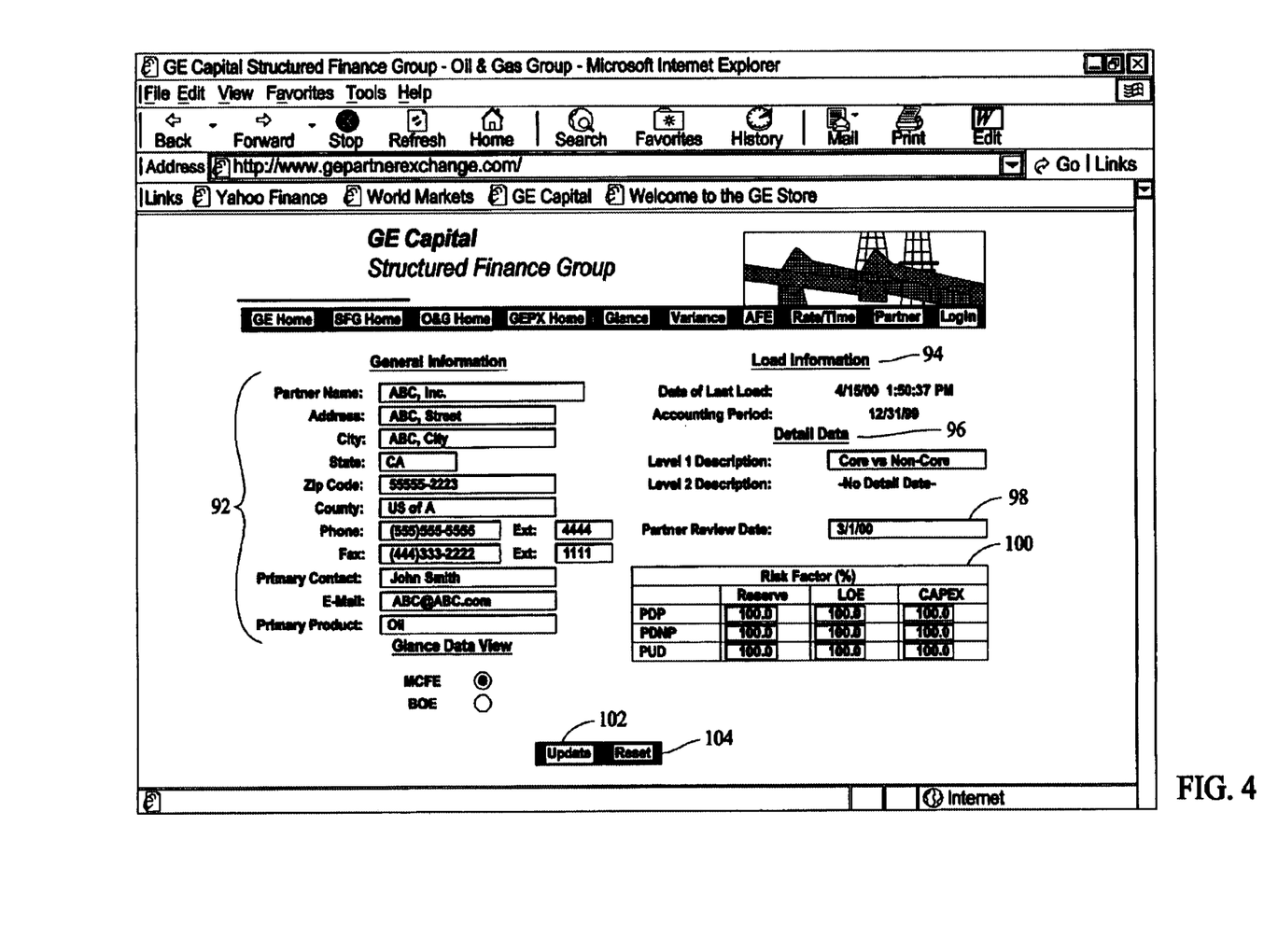
FIG. 4, shows a web page where a registered user may update personal and project information.

FIG. 4 is an exemplary example of a user information page 90. Page 90 includes name and contact information 92 for a selected partner, load information 94 including a date that the partner last uploaded data and the end of the accounting period for the data, detail data 96, a partner review date 98, which is the date the selected partner last reviewed the site, and a risk factor table 100. Risk factor table 100 is a matrix showing business indices. Using the oil and gas partnership example, risk factor table charts wells that are proved, developed and producing (PDP), proved, developed and non-producing (PDNP), and proved, undeveloped (PUD) against reserves, lease operating expenses and capital expenditures (CAPEX). An update button 102 will cause newly entered information to be uploaded to the data base 16 located in server 12 (both shown in FIG. 1). Reset button 104 will clear any newly entered information.

Figure 5:
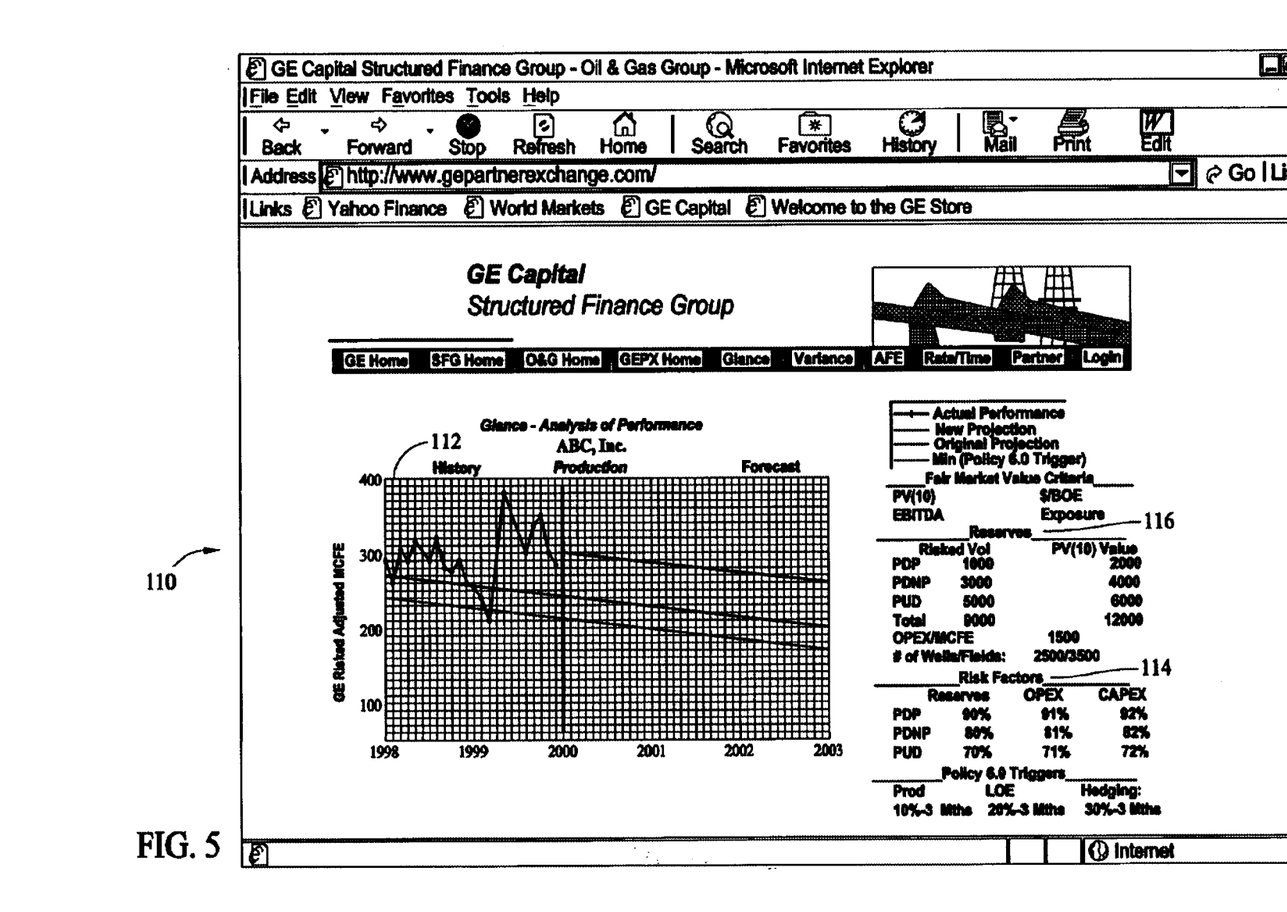
FIG. 5 is an exemplary example of a web page configured as a glance chart.

FIG. 5 is an exemplary example of a glance chart 110. Glance chart page 110 is downloaded from server 12 when the user selects the choose glance chart 36 (shown in FIG. 2) tool from the main page 70 (shown in FIG. 3). In the embodiment shown in FIG. 5, page 110 includes chart 112 which indicates historical and forecast information. In the oil and gas example, chart 112 shows production information in the form of graphs for actual performance, new projections, original projections, and minimums. Risk factors 114 and reserves 116, described above, are shown tabulated as are policy triggers 118.

Figure 6:
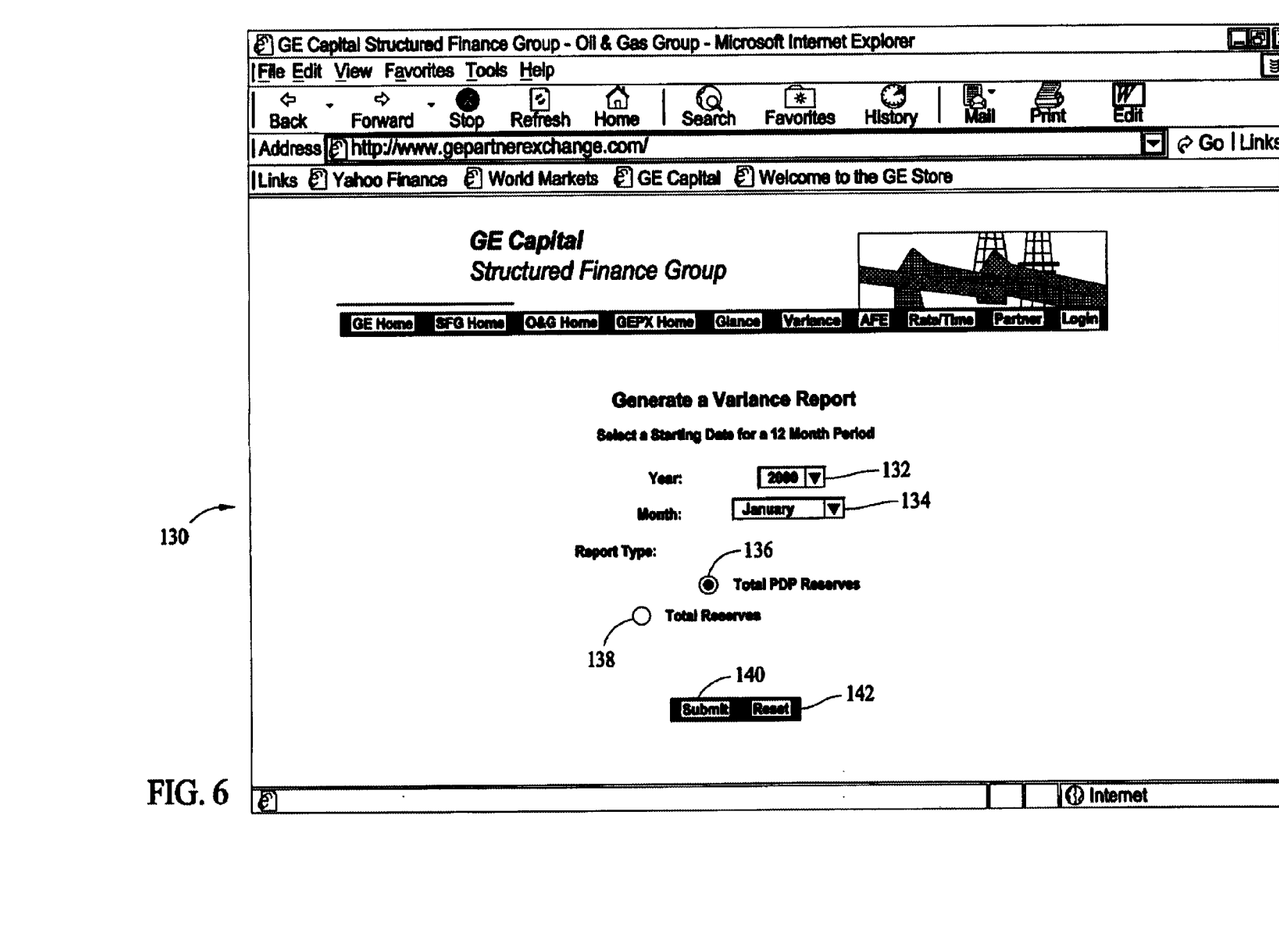
FIG. 6 is an exemplary embodiment of a web page configured as a user interface for configuration and generation of a variance report.
Figure 7:
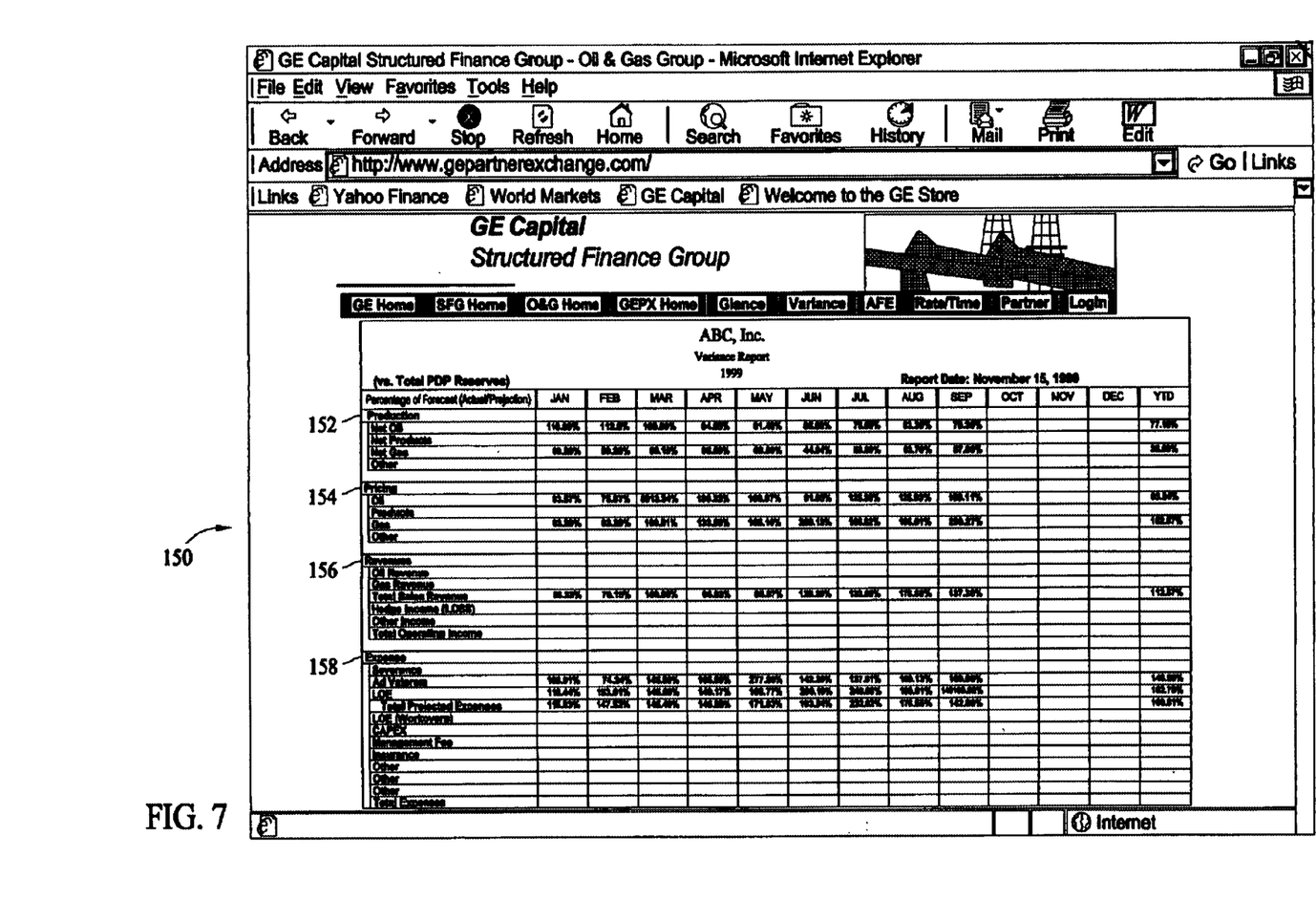
FIG. 7 is an exemplary example of a web page configured as a variance report.

FIG. 6 shows an exemplary page 130, where a user selects options to be used in generating a variance report. Page 130 is downloaded from server 12 when the user selects the variance report options 34 (shown in FIG. 2) tool from the main page 70 (shown in FIG. 3). In one embodiment, pull-down menus for a year 132 and month 134 select the starting date for a reporting period, in the embodiment shown, a twelve month period. A report type is also selected, in the oil and gas example, selections for total PDP reserves 136 and total reserves 138 are available. A submit button 140 causes the selections to be uploaded to server 12 for the generation of the variance report. Reset button 142 resets any user entered data to a default condition, for example January of the current year. FIG. 7 is an exemplary example of a variance report 150 for a selected twelve month period, downloaded from server 12 after selection of submit button 140. In the oil and gas example, report 150 includes data on production 152, pricing 154, revenue 156, and expenses 158.

FIG. 8 is an exemplary example of an authorization for expenditure (AFE) tracking chart 190, downloaded from server 12 when the user selects the authorizations for expenditure page 42 (shown in FIG. 2) tool from the main page 70 (shown in FIG. 3). In one embodiment, chart 190 lists AFE Cost 172, actual cost 174, and comments 176 relating to the costs. A user may enter information to be uploaded to server 12, the uploading taking place after selection of a submit button (not shown in FIG. 8).

As above described, the information exchange website greatly reduces the time spent assembling, formatting, printing, and submitting the required reports of a business. With the electronic platform, costs of archiving and managing are reduced, increasing the productivity of an operation. Real time, on-line information, enhances communication and the need for live meetings and the associated costs in preparation for such meetings is reduced.

In addition, performances are enhanced as the online reports and analysis provide clearer picture of performance, enabling better previews and preparations for any arising problems to be dealt with or potential opportunities that may arise. Enhanced communications capabilities provides for better, faster response times across all facets of a business and encourages partners to be proactive regarding issues and opportunities.

While the invention has been described in terms of various specific embodiments, those skilled in the art will recognize that the invention can be practiced with modification within the spirit and scope of the claims.

What is claimed is:

1. A method for exchanging information within a partnership using a web-based system including a server having a centralized database of business data relating to the partnership and at least one client system, said method comprising:

restricting database access only to authorized users within the partnership;

providing forms stored within the server as web pages for the insertion of updated partnership business data and causing the forms to be displayed on a client system, at least one of the forms including an add authorization for expenditure form;

uploading forms that include updated partnership business data intended for use by other authorized users within the partnership to the server, where the updated partnership business data is stored within the database;

formatting the partnership business data uploaded using web pages stored within the server;

downloading the web pages to authorized users requesting the updated partnership business data;

causing the web pages to be displayed on a client system including at least one authorization for expenditure web page; and prompting an authorized user through the at least one authorization for expenditure web page displayed on the client system to approve or disapprove of a proposed expenditure within the partnership.

2. A method according to claim 1 wherein said step of restricting database access only to authorized users further comprises the step of accessing a home page which includes a user login interface.

3. A method according to claim 1 wherein said step of providing forms stored within server as web pages further comprises the steps of:

downloading a main page; and accessing an information page.

4. A method according to claim 3 wherein said step of accessing an information page further comprises the step of updating the database with the current date to show when the authorized user last accessed the database.

5. A method according to claim 3 wherein said step of accessing an information page further comprises the step of updating the database with a review date to show when the authorized user last reviewed the database.

6. A method according to claim 1 wherein said step of downloading the web pages to authorized users further comprises the step of downloading a glance chart.

7. A method according to claim 6 wherein said step of downloading a glance chart further comprises the step of downloading one or more of a hedge chart, a lease operating expense chart and a production chart.

8. A method according to claim 1 wherein said step of downloading the web pages to authorized users further comprises the step of downloading a web page used for inputting parameters used in generation of a variance report.

9. A method according to claim 1 wherein said step of downloading the web pages to authorized users further comprises the step of downloading a variance report.

10. A method according to claim 9 wherein said step of downloading a variance report further comprises the step of downloading a variance report plotted as a rate versus time curve.

11. A method according to claim 1 wherein said step of downloading the web pages to authorized users further comprises the step of downloading an authorization for expenditure tracking chart.

12. A method according to claim 1 wherein the client system and the server are connected via a network.

13. A method according to claim 12 wherein the network is one of a wide area network, a local area network, an intranet, and the Internet.

14. A method according to claim 1 further comprising enabling the authorized users to input a plurality of parameters into a web page displayed on a client system to generate a plurality of reports and charts that are based on the updated partnership business data, the plurality of reports and charts are displayed on the client system.

15. A web-based system for exchanging information within a partnership, said system comprising:
at least one client system comprising a browser; and
a server further comprising a database of business data relating to the partnership and configured to be coupled to said client system, said server further configured to restrict said database access only to authorized users within the partnership, provide forms stored within said server as input web pages for the insertion of updated partnership business data wherein at least one of the forms includes an add authorization for expenditure form, cause the input web pages to be displayed on said client system, upload updated forms that include updated partnership business data intended for use by other authorized users within the partnership to said server, where the updated partnership business data is stored within said database, format the partnership business data uploaded using output web pages stored within said server, download the output web pages to authorized users requesting the updated partnership business data, cause the output web pages to be displayed on said client system including at least one authorization for expenditure web page, and prompt an authorized user through said at least one authorization for expenditure web page displayed on said client system to approve or disapprove of a proposed expenditure within the partnership.

16. A system according to claim 15 wherein said server further configured with a home page which includes a user login interface.

17. A system according to claim 15 wherein said server configured to allow access to an information page from said main page.

18. A system according to claim 17 wherein said server further configured to update said database with the current date to show when the authorized user last accessed said database.

19. A system according to claim 17 wherein said server further configured to update said database with a review date to show when the authorized user last reviewed said database.

20. A system according to claim 15 wherein server further configured to download a glance chart.

21. A system according to claim 20 wherein said glance chart further comprises one or more of a hedge chart, a lease operating expense chart and a production chart.

22. A system according to claim 15 wherein said server further configured to accept as input parameters used in generation of a variance report.

23. A system according to claim 15 wherein said server further configured to download a variance report.

24. A system according to claim 23 wherein said server further configured to download a variance report plotted as a rate versus time curve.

25. A system according to claim 15 wherein said server further configured to download an authorization for expenditure tracking chart.

26. A method according to claim 15 wherein said client system and said server are coupled via a network.

27. A system according to claim 26 wherein said network is one of a wide area network, a local area network, an intranet, and the Internet.

28. A system according to claim 15 wherein said server is further configured to enable said authorized users to input a plurality of parameters into a web page displayed on a client system to generate a plurality of reports and charts that are based on the updated partnership business data, said plurality of reports and charts are displayed on said client system.

29. A system according to claim 15 wherein the updated partnership business data includes oil and gas exploration data, wherein at least one of the forms includes an authorization for expenditure form relating to oil and gas exploration, and wherein said server is further configured to:
enable an authorized user to access an information page via the at least one client system;
display on the information page a risk factor table associated with the partnership's oil and gas exploration; and
prompt an authorized user through the at least one authorization for expenditure web page displayed on the client system to approve or disapprove of a proposed expenditure within the partnership based on the risk factor table.

30. A system according to claim 29 wherein the risk factor table charts wells that are proved, developed and producing (PDP); proved, developed, and non-producing (PDNP); and proved and undeveloped (PUD) against at least one of reserves, lease operating expenses and capital expenditures (CAPEX).

31. A method for exchanging information within a partnership involved in oil and gas exploration using a web-based system including a server having a centralized database of business data relating to the partnership and at least one client system, said method comprising:

restricting database access only to authorized users within the partnership;

providing forms stored within the server as web pages for the insertion of updated partnership business data including oil and gas exploration data, at least one of the forms including an authorization for expenditure form relating to oil and gas exploration;

uploading forms that include updated partnership business data intended for use by other authorized users within the partnership to the server, where the updated partnership business data is stored within the database;

enabling an authorized user to access an information page via the at least one client system;

displaying on the information page a risk factor table associated with the partnership's oil and gas exploration; and     prompting an authorized user through the at least one authorization for expenditure web page displayed on the client system to approve or disapprove of a proposed expenditure within the partnership based on the risk factor table.

32. A method in accordance with claim 31 wherein displaying on the information page a risk factor table further comprises displaying on the information page a risk factor table that charts oil and gas wells that are proved, developed and producing (PDP); proved, developed, and non-producing (PDNP); and proved and undeveloped (PUD) against at least one of reserves, lease operating expenses and capital expenditures (CAPEX).

* * * * *